US012580759B2

(12) United States Patent (10) Patent No.: US 12,580,759 B2

Diaz et al. (45) Date of Patent: Mar. 17, 2026

(54) METHOD OF UTILIZING PHYSICAL OBJECTS IN A BLOCKCHAIN

(71) Applicant: Expanse Laboratories Corporation, Plantation, FL (US)

(72) Inventors: Marc Howard Diaz, Plantation, FL (US); Shain Lafazan, Reno, NV (US)

(73) Assignee: Expanse Laboratories Corporation

( * ) Notice: Subject to any disclaimer, the term of this patent is extended or adjusted under 35 U.S.C. 154(b) by 0 days.

(21) Appl. No.: 19/108,933

(22) PCT Filed: Dec. 8, 2023

(86) PCT No.: PCT/US2023/083257

§ 371 (c)(1),
(2) Date: Mar. 5, 2025

(87) PCT Pub. No.: WO2024/124223

PCT Pub. Date: Jun. 13, 2024

(65) Prior Publication Data

US 2025/0266994 A1 Aug. 21, 2025

Related U.S. Application Data

(60) Provisional application No. 63/529,010, filed on Jul. 26, 2023, provisional application No. 63/431,173, filed on Dec. 8, 2022.

(51) Int. Cl.
H04L 9/08 (2006.01)

(52) U.S. Cl.
CPC ............ H04L 9/088 (2013.01); H04L 9/0861 (2013.01)

(58) Field of Classification Search
CPC ............................. H04L 9/088; H04L 9/0861
See application file for complete search history.

(56) References Cited

U.S. PATENT DOCUMENTS

| | | | | |
|---|---|---|---|---|
| 8,771,052 | B2 * | 7/2014 | Pececnik | G07F 17/3262 |
| | | | | 463/30 |
| 9,317,221 | B2 * | 4/2016 | Ishikawa | G06F 16/1827 |
| 9,569,771 | B2 | 2/2017 | Lesavich et al. | |
| 10,102,526 | B1 * | 10/2018 | Madisetti | G06Q 20/389 |
| 10,505,978 | B2 | 12/2019 | Wang | |
| 10,573,059 | B2 | 2/2020 | Jacobs, II | |

(Continued)

FOREIGN PATENT DOCUMENTS

WO 2019212958 A1 11/2019

*Primary Examiner* — William S Powers

(74) *Attorney, Agent, or Firm* — Mark C. Johnson; Johnson Dalal

(57) ABSTRACT

A physical system of blockchain and method for securely recording and accessing information which includes the ability to be distributed, resilient to interference, resilient to damage, recoverable, anonymous, free of oligarchic control, auditable, and other advantages. Specifically, one embodiment of the present invention may include a plurality of physical tokens and one or more physical reference plates that together provide proof of stake by using a method of linear measurements and keys in a system of coordinate geometry, i.e., distances are measured to and from reference points on either one of the physical tokens and plate to another of the tokens or location on the plate to generate an encryption key to encrypt or decrypt a message or access data stored on a blockchain network.

8 Claims, 14 Drawing Sheets

(56) References Cited

U.S. PATENT DOCUMENTS

| 10,677,886 | B2 | 6/2020 | Meadow | | |
|---|---|---|---|---|---|
| 11,153,092 | B2 | 10/2021 | Staples et al. | | |
| 2001/0046293 | A1 | 11/2001 | Gleeson | | |
| 2003/0115453 | A1* | 6/2003 | Grawrock | G06F 21/57 | |
| | | | | 713/155 | |
| 2006/0227974 | A1* | 10/2006 | Haraszti | H04L 9/0866 | |
| | | | | 380/280 | |
| 2008/0244721 | A1 | 10/2008 | Barrus | | |
| 2009/0052663 | A1* | 2/2009 | Hammond | H04L 9/0838 | |
| | | | | 380/44 | |
| 2009/0183248 | A1* | 7/2009 | Tuyls | H04L 9/0838 | |
| | | | | 713/172 | |
| 2015/0317644 | A1 | 11/2015 | Chanez et al. | | |
| 2017/0099140 | A1* | 4/2017 | Hoy | H04L 9/3006 | |
| 2018/0365446 | A1 | 12/2018 | Alves De Carvalho et al. | | |
| 2020/0358614 | A1 | 11/2020 | Fiske | | |
| 2021/0314328 | A1 | 10/2021 | Simons | | |
| 2022/0261882 | A1 | 8/2022 | Youb et al. | | |

* cited by examiner

Symbolic Data Network (comprised of multiple Symbolic Data Network Nodes)

800

METHOD OF UTILIZING PHYSICAL OBJECTS IN A BLOCKCHAIN

FIELD OF THE INVENTION

The present invention relates to a system and method of utilizing physical objects, particularly to generate an encryption key, in a blockchain, in addition to a system and method of transforming data from a digital format to a symbolic format, Symbolic Compressed Data (SCD), through a new method called Symbolic Encoding, which changes data into representative symbols, and the complimentary Symbolic Decoding method, thereby transforming symbolic data into normal data.

BACKGROUND OF THE INVENTION

Blockchain is a method of immutably recording information with verifiable order and contents. The current art has many weaknesses, inefficiencies, and potential points of failure. These arise from their reliance on lack of anonymity, digital proof of work, digital proof of stake, digital method of data recording, purely digital communication, lack of resilience, limited transportability, and others. Current art operates in such a way that user anonymity is difficult or impossible to achieve in practice. Current art requires that all users be registered on a centralized database, making them vulnerable to oligarchic control. Current proof of work art requires a massive computational effort. This requires a commensurately massive use of energy with substantial negative environmental impacts. Digital proof of work blockchain is difficult to convert to less energy intensive proof of stake blockchain. Current art can lead to loss of data and securities if passcodes are lost or forgotten. Current art has data stored in a digital format which can be destroyed or rendered inaccessible due to disaster or other forms of disruption. Current art requires that owners of data or securities cannot be anonymous. Current art is vulnerable to sustained loss of normal forms of digital communication. Current art is not able to be self-authenticating in a physical form. For example, when accompanying goods in trade. Current art is divided into four categories. There are public, hybrid, private, and consortium blockchains. Each one can perform certain functions that the others cannot. However, none can perform all of the functions of the others. Taken together these problems create serious weaknesses including multiple single points of failure. Physical blockchain fulfills a demonstrated market need by preserving trust while solving the problems listed above. Persons and organizations interested in making blockchain transactions, smart contracts, data storage, and other uses will all find value in this invention.

With the increasing amount of data generated and shared every day, there is a growing need for efficient data compression and transmission methods. The current state-of-the-art data compression and transmission methods are based on statistical models such as Huffman coding, arithmetic coding, and Lempel-Ziv-Welch (LZW) compression. While these methods are effective, they have limitations in terms of compression ratio, computational complexity, and transmission efficiency.

In particular, new systems such as public blockchains now exist in which distributed networks share and utilize vast amounts of storage space and bandwidth, often for the same ever-growing datasets and transmission payloads. Furthermore, in the case of blockchains, published data is frequently limited in size, and data publishing and transfer are often both limited by functionality and expense.

Also recently, AI systems now exist that operate on massive, often-overlapping datasets. With these systems' increasing size and scale and usage patterns, vector storage databases will become more important, and the size and scale of stored vectors will grow exponentially.

Symbolic Encoding is a new approach to data compression and transmission that overcomes some of the limitations of the current methods. Symbolic Encoding and Decoding is based on the idea of representing digital information symbolically, and where all numeric data (and therefore all data, encoded numerically) may be transformed into a set of real and irrational numbers with a particular set of encoding patterns. Therefore, it is possible to achieve higher compression ratios and better transmission efficiency compared to the current methods. The primary limitation of Symbolic Encoding is the computation required to build symbolic representations of data.

By using distributed or centralized networks of linked devices, or even multiple encoders on the same device, Symbolic Encoding can be parallelized using various algorithms, including the Chudnovsky $\pi$ calculation method, the Bailey-Borwein-Plouffe $\pi$ calculation method, square root computation of a prime number, etc. This allows significant encoding and compression of information by networks of machines that create and communicate symbolic encodings, termed here as Symbolic Data Networks.

It is important to note that a novel aspect of the present invention is its physical and digital properties. It may be implemented physically, digitally, or in a physically and digitally interoperable manner; therefore, another embodiment of the data transformation method describe is purely digital.

Therefore, a need exists to overcome the problems with the prior art as discussed above.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and explain various principles and advantages all in accordance with the present invention.

SUMMARY OF THE INVENTION

Figure 1:
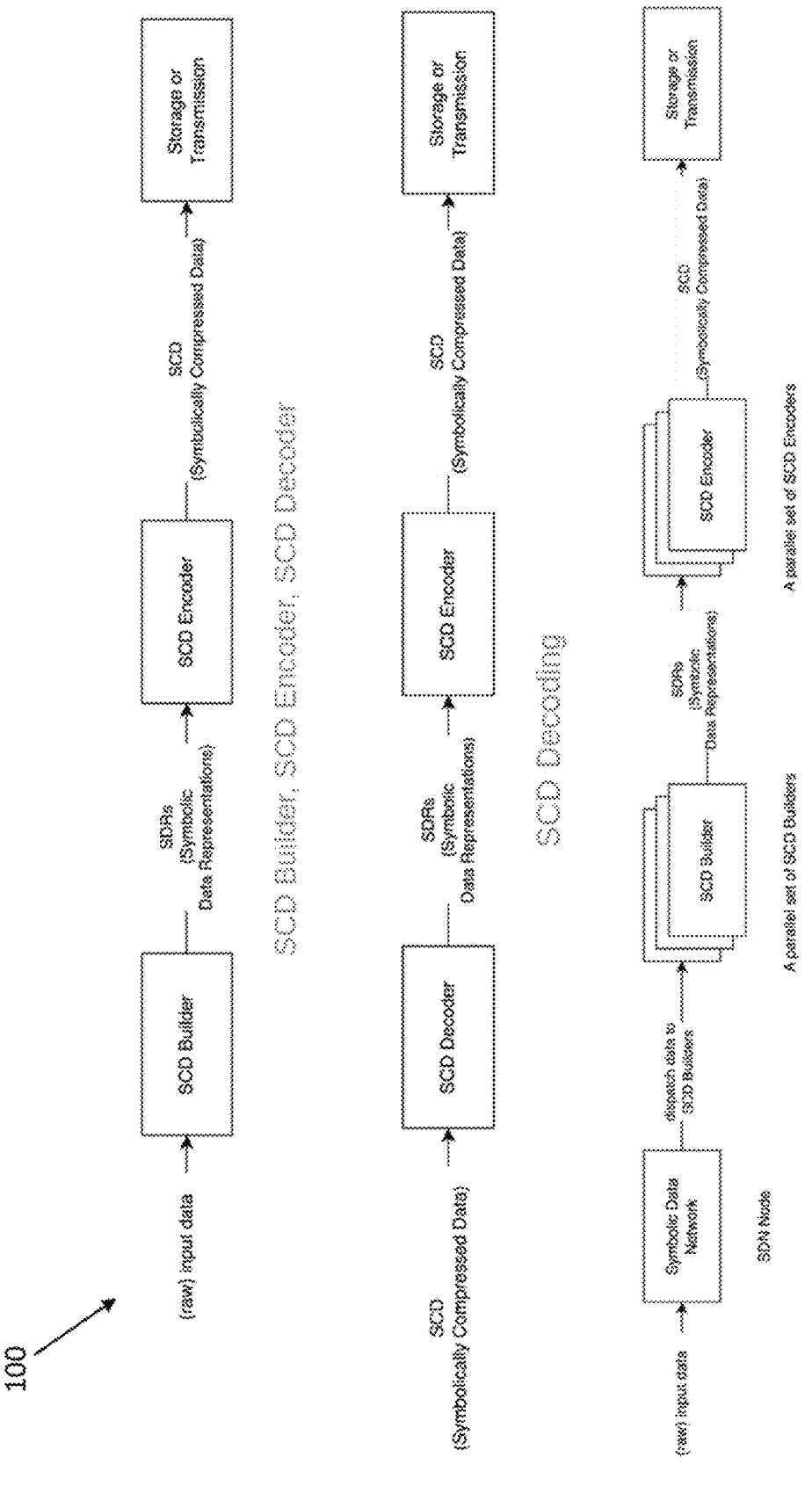
FIG. 1 depicts a flowchart diagram of exemplary visual representations of the SCD Builder, SCD Encoder, and SCD Decoder logic units, as well as a Symbolic Data Network and the parallel building and encoding process, and a demonstration of the data transformation to SDR using the symbol $\pi$, in accordance with the present invention.
Figure 2:
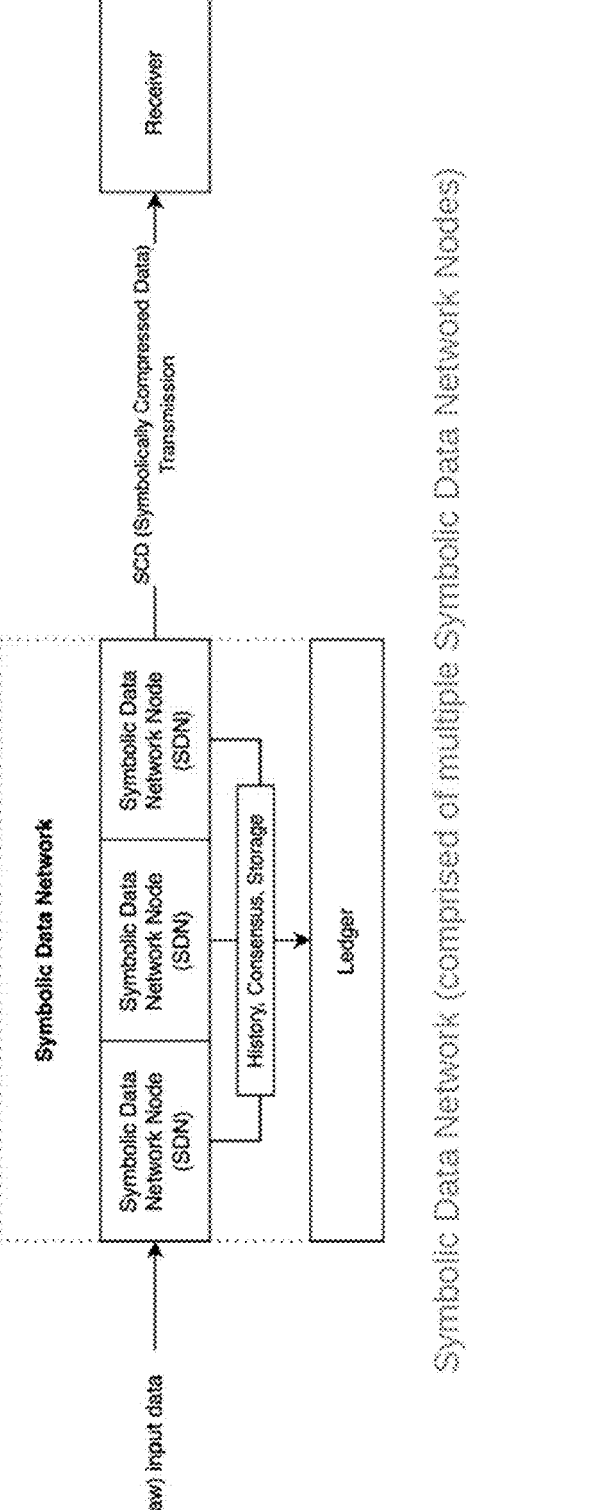
FIG. 2 depicts a flowchart diagram of an exemplary Symbolic Data Network (comprised of multiple Symbolic Data Network Nodes), in accordance with the present invention.
Figure 3:
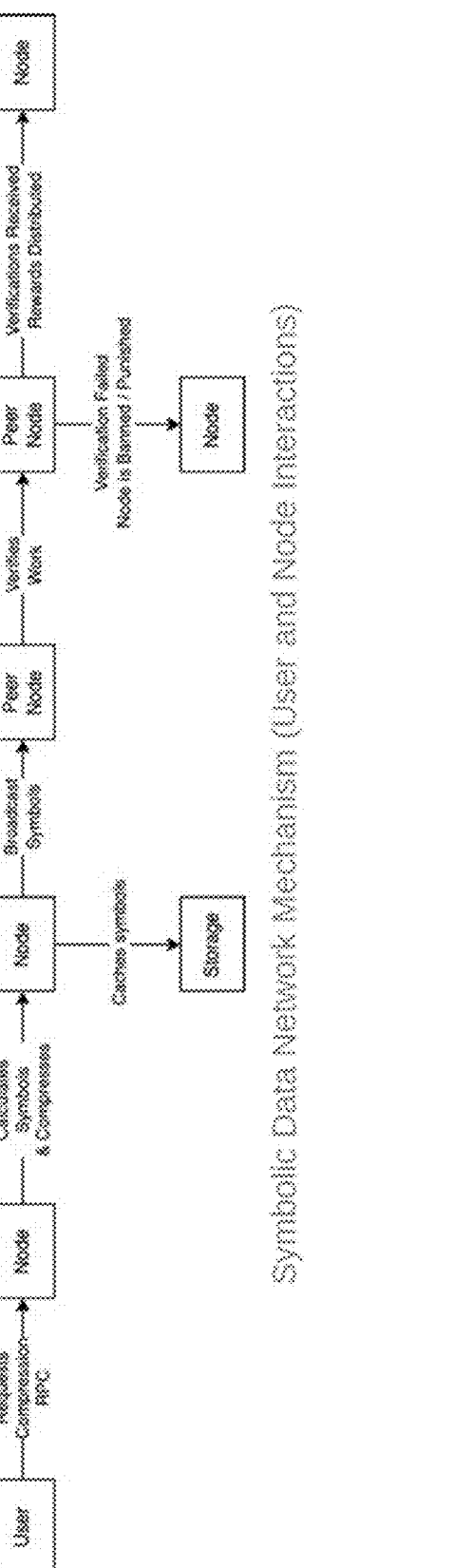
FIG. 3 depicts a flowchart diagram of an exemplary Symbolic Data Network Mechanism (User and Node Interactions), in accordance with the present invention.
Figure 4:
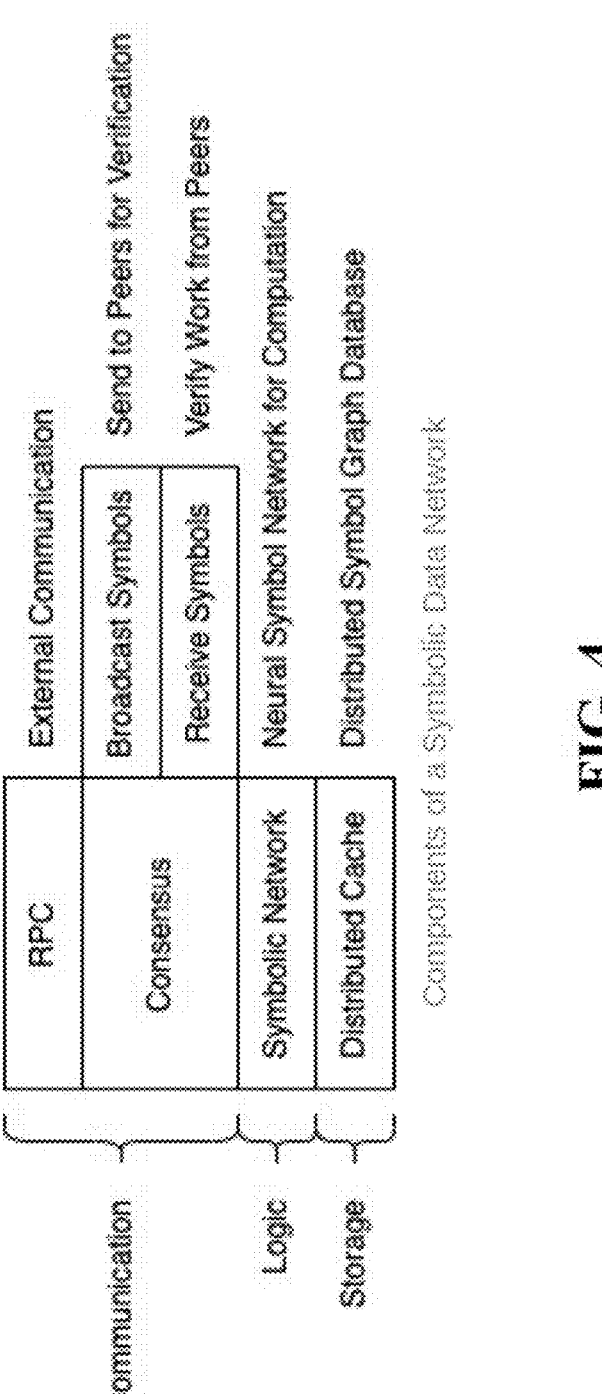
FIG. 4 depicts a diagram of exemplary Components of a Symbolic Data Network, in accordance with the present invention.

The invention provides a system and method for physical blockchain and a system and method for physical blockchain embodied in a symbolic data network method and system for data transformation, compression, and transmission that overcomes the hereinafore-mentioned disadvantages of the heretofore-known devices and methods of this general type and that provides a more resilient and reliable method of storing information.

Physical blockchain addresses the problems with current art that are listed above. It uses physical objects and coordinate geometry to act as a cryptographic key. This key then gives access to data files which can be distributed to one or more locations for resilience. In the principal embodiment coordinate geometry is used to determine the linear distance between a plurality of known points on these physical objects. The distances between these points are then used to form a cryptographic key to give access to stored data. The number of reference point permutations are so great that the potential number of keys, and associated data files, are essentially limitless. This large number of permutations makes bad actor efforts to use computing to break the cypher economically unfeasible. The data files can be used for a plurality of purposes including but not limited to financial transactions, data storage, smart contracts (i.e., a program stored on a blockchain that executes commands when predetermined conditions are met), transition from proof of work blockchain to proof of stake blockchain, proof of trust for multiple party transactions, proof of ownership of physical assets or real property, and others.

In addition, the physical nature of this invention lends itself to a plurality of uses through self-authentication. These include but are not limited to, recovery if digital keys or passwords are lost or forgotten, acting as a form of bearer bond, used as proof of receipt of goods, and others.

With the foregoing and other objects in view, there is provided, in accordance with the invention, a method of utilizing physical objects to generate an encryption key in blockchain is disclosed, and includes the steps of providing a plurality of physical tokens, each having a plurality of randomly formed spaced demarcations thereon, and a physical reference plate formed with a plurality of channels, each shaped and sized to receive the plurality of physical tokens and each having at least one randomly formed reference point demarcation associated therewith, inserting each of the plurality of physical tokens into one of the plurality of channels, and placing the inserted plurality of physical tokens in an erect configuration relative to the physical reference plate, measuring and summing token distances between a plurality of sets of the plurality of physical tokens to generate an encryption key, and utilizing the encryption key to encrypt or decrypt a message or access data stored on a blockchain network. Each of the token distances are defined by one of the plurality of randomly formed spaced demarcations on one of the plurality of physical tokens in a set or a randomly formed reference point demarcation on the physical reference plate associated therewith, and another one of the plurality of randomly formed spaced demarcations on one of the plurality of physical tokens in the set or a randomly formed reference point demarcation on the physical reference plate associated therewith.

In accordance with another feature, an embodiment of the present invention includes generating the encryption key by measuring a linear distance between two of the plurality of randomly formed spaced demarcations on one of the plurality of physical tokens and multiplying the linear distance by the measured and summed token distances.

In accordance with a further feature of the present invention, the at least one randomly formed reference point demarcation is disposed proximal to the associated one of the plurality of channels and the token distances form a three-dimensional map.

In accordance with yet another feature, an embodiment of the present invention also includes providing the physical reference plate with a plurality of rows and columns, each formed with the plurality of channels configured to form a three-dimensional, four-dimensional, or other multi-dimensional map with the token distances.

In accordance with a further feature of the present invention, each token distance is linear and the plurality of formed spaced demarcations are annular recesses.

In accordance with an additional feature, an embodiment of the present invention also includes providing a plurality of physical reference plates coupled together to form the blockchain.

In accordance with an additional feature, an embodiment of the present invention also includes providing the plurality of physical tokens with a reference code thereon and providing the physical reference plate with a reference code associated with each of the plurality of channels and corresponding to the reference code on one of the plurality of physical tokens and inserting each of the plurality of physical tokens into one of the plurality of channels with a corresponding reference code.

Although the invention is illustrated and described herein as embodied in a method of utilizing physical objects to generate an encryption key in blockchain, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Referring now to FIG. 1, the present invention provides a novel and symbolic data network method and system for data transformation, compression, and transmission (herein referred to as "method and system 100" for brevity) for transforming data from a digital format into Symbolic Compressed Data (SCD) using Symbolic Encoding and Decoding. This includes encoding, compressing, storing, transmitting, decoding, and decompressing data using symbolic representations and networks. It defines a new term, "Symbolic Data Networks", which describes a system of transforming, communicating, storing, and transmitting SCD. It defines a new type of data representation, Symbolic Compressed Data, which is the primary object of the method.

In accordance with the present invention, the following definitions may be applicable. Specifically, "Symbolic Encoding" is an approach to data transformation through encoding and compression that represents data symbolically using symbols. "Symbolic Decoding" is an approach to data transformation through decoding and decompressing from symbolic data. "Symbolic Data Network (SDN)" is a new approach to Symbolic Encoding and Decoding that uses distributed or centralized networks of linked computers to parallelize the encoding, compression, transmission, and storage of information. "Symbolic Data Network Node (SDNN)" is a single unit or computer in a distributed or centralized network of linked computers that make up a Symbolic Data Network. SDNNs can execute the method of encoding, compressing, storing and transmitting, decoding, and decompressing data in parallel with other SDNNs to increase efficiency and reduce the time to compress data. Each SDNN can communicate with other SDNNs to assist with the method or verify the accuracy of the method. "Symbolic Data Representation (SDR)" is the symbolic representation of data that is constructed by analyzing the data and identifying a symbolic pattern or set of symbolic patterns. The SDR is used as a basis for encoding and compressing the data using the Symbolic Data Networks method. "Symbolic Data Token (SDT)" is a synonym for SDR. "Symbolic Compressed Data (SCD)" is a new type of data representation used in Symbolic Encoding and Decoding that involves a compressed and encoded representation of data, a set of symbolic patterns and identifiers that represent the data, and a set of instructions for decoding and decompressing the data. "Flexible Encoding System (FES)" is a system of encoding where multiple modes and/or algorithms of encoding may be used to tokenize and compress data. "SCD Builder" is a logic unit used in Symbolic Data Networks to build symbolic representations of data. "SCD Encoder" is a logic unit used in Symbolic Data Networks to encode data using symbolic representations. "SCD Decoder" is a logic unit used in Symbolic Data Networks to decode and decompress data using symbolic representations. "SCD Encodings Library" is a set of SCD Encodings stored for future use. "Data compression" is the process of encoding data in a way that reduces the amount of storage space it requires. "Data transmission" is the process of sending data from one device to another. "Statistical models" are mathematical models are used to analyze data and predict future events. "Huffman coding" is a popular data compression algorithm that uses variable-length codes to represent data. "Arithmetic coding" is a data compression algorithm that encodes data as a single number between 0 and 1. "Lempel-Ziv-Welch (LZW) compression" is a data compression algorithm that replaces repeated patterns in data with a single code. "TCP/IP" is a communication protocol used to transmit data over the internet. "UDP" is a communication protocol used for fast, low-latency transmission of data. "HTTP" is a communication protocol used to transmit data over the internet.

In a network of computers, parallel computing can be achieved using distributed computing. Distributed computing is the use of multiple computers connected by a network to work together on a single problem or task. Each computer in the network performs a small part of the task, and the results are combined to produce the final result. This allows for faster computation and increased efficiency. In the case of Symbolic Data Networks, the SCD Builder and SCD Encoder logic units can be used in parallel with other instances of the same logic units to greatly increase efficiency and reduce the time to compress data.

The method of the present invention for transforming data into Symbolic Compressed Data using the Symbolic Encoding and Decoding method and system, including encoding, compressing, storing and transmitting, decoding, and decompressing data using symbolic representations, encodings, and networks, is described in detail below.

The method of Symbolic Encoding and Decoding may be considered in three parts, which together comprise a set of methods for data transformation and restoration: (1) Parallel Encoding and Compression; (2) Storage and Transmission; and (3) Decoding and Decompression. While Symbolic Encoding and Decoding may be performed independently, all three parts of this method are required for a Symbolic Data Network to operate. The encoding and compressing stage of the method includes the following steps: First, build one or more Symbolic Data Representations (SDRs) of the data with the SCD Builder (in other words, converting data to SCD) in serial or in parallel. Second, encoding the data using the identified symbolic representations with the SCD Encoder. Next, repeating steps 1 and 2 with the encoded data and associated compression. The storing and transmitting stage of the method includes the following steps: (1) Storing or transmitting the encoded data using the SCD Encodings Library or other means. The decoding and decompressing stage of the method includes the following steps: (1) Decoding and decompressing the data using the identified symbolic representations with the SCD Decoder.

The system of Symbolic Encoding and Decoding includes several components: (1) An input unit for information; (2) an SCD Builder logic unit that may be used in parallel with other SCD Builders; (3) an SCD Encoder logic unit that may be used in parallel with other SCD Encoders; (4) an SCD Decoder logic unit; and (5) an SCD Encodings Library. In the case of a Symbolic Data Network, two or more Symbolic Encoding and Decoding systems comprise a parallel system using the same Symbolic Encoding and Decoding method.

The first step in the method is to build a symbolic representation of the data. The data can be any type of digital information, such as text, images, audio, or video. The symbolic representation is constructed by analyzing the data and identifying a symbolic pattern or set of symbolic patterns. The SCD Builder can build symbolic representations in parallel to greatly increase efficiency and reduce the time to compress data. If the encoding already exists in the SCD Encodings Library, the previous computation may be used instead.

The second step is to submit the data to the SCD Encoder logic unit, which encodes the data using the identified symbolic pattern or set of patterns. The encoding process involves replacing the data with the corresponding symbolic representations. This results in a compressed and encoded representation of the data that can be stored and transmitted more efficiently. The SCD Encoder can encode data in parallel to greatly increase efficiency and reduce the time to compress data. At this point, the encodings may be saved for future use in the SCD Encodings Library.

The third step is to transmit the encoded data to a receiver or store it. The SCD can be transmitted physically, if encoded into a physical key, plate, or object, or digitally, using any suitable communication protocol, such as TCP/IP, UDP, or HTTP.

The final step is to decompress and decode the data from storage or from transmission received. The receiver can decode the data using the SCD Decoder.

The present invention provides several advantages over the current state-of-the-art data compression and transmission methods. Some of the key advantages are as follows. First, higher compression ratios: Symbolic Encoding can achieve higher compression ratios compared to the current methods. Second, better transmission efficiency: SCD is much smaller in size and allows information to be transmitted more efficiently when compared to the current methods. Third, compression Libraries: Symbolic Data Networks can compress and store more information than existing systems.

Figure 5:
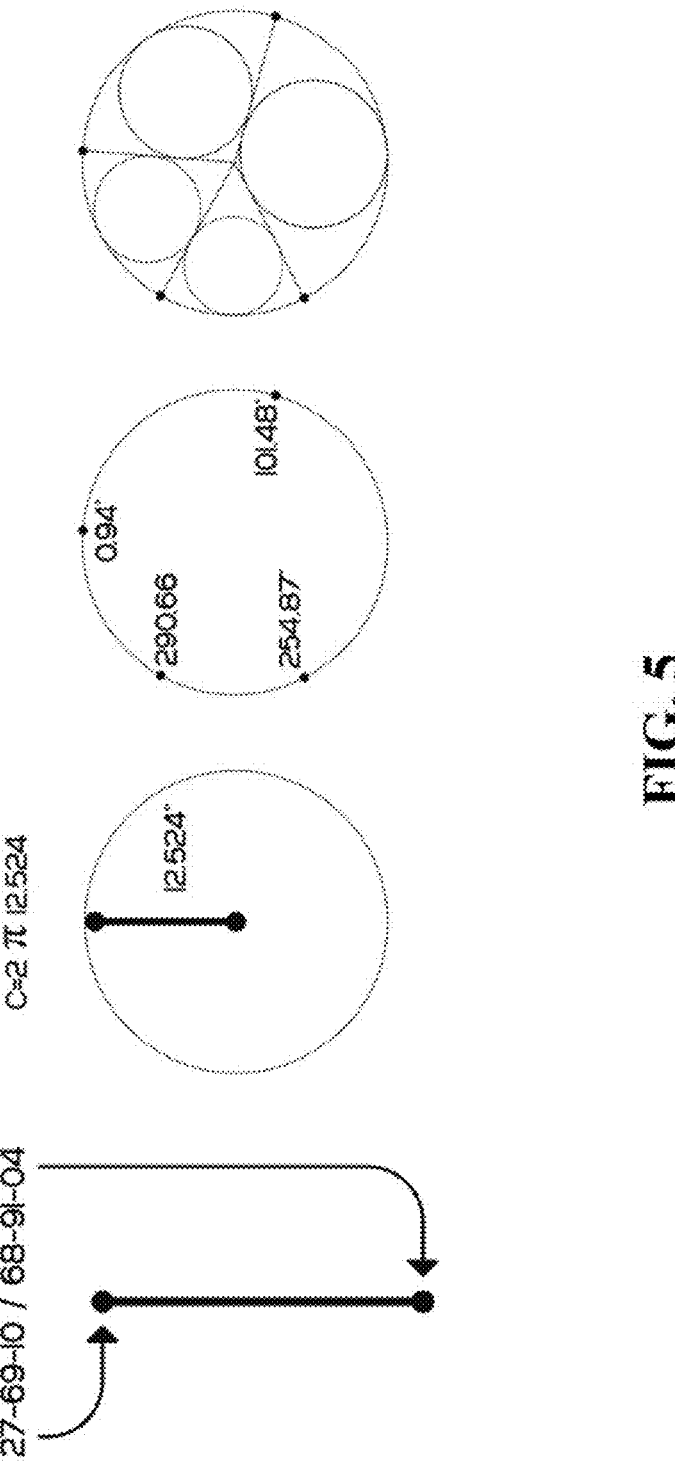
FIG. 5 depicts a diagram of an exemplary Coordinate Pair (Raw Data) to Symbolic Data Representation (SDR) Encoding, in accordance with the present invention.
Figure 6:
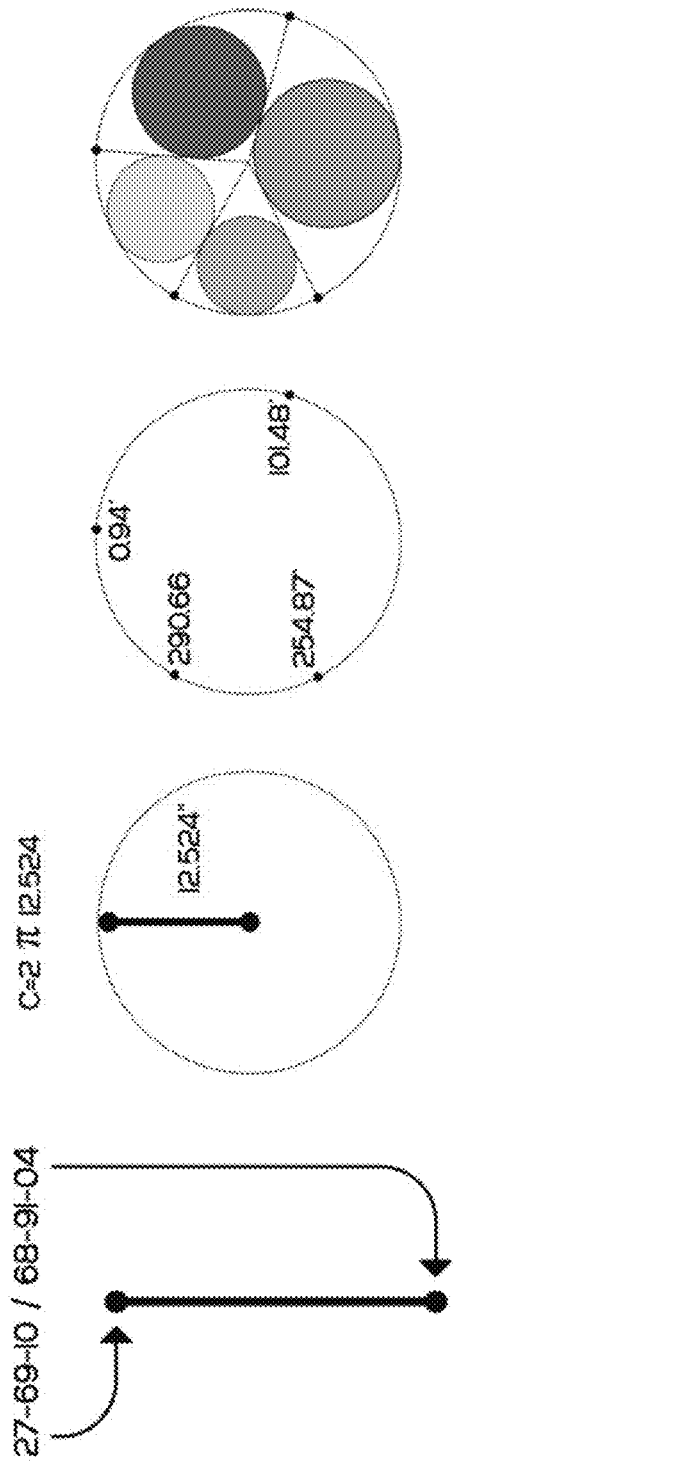
FIG. 6 depicts a diagram of an exemplary Coordinate Pair (Raw Data) to a Tree of Symbolic Data Representation (SDR) Encodings, in accordance with the present invention.

For example and with reference to FIGS. 5-6, two coordinates yield a specific distance. This is used as a radius of a circle. Four additional coordinates are for points on the circumference of the circle. This yields 4 more circles. The circumference of a circle, determined by the value of $\pi$, is an irrational number whose decimal expansion continues indefinitely. This unique property allows for the storage of vast amounts of data by utilizing the distance along the circumference. Consequently, data is effectively transformed and conveyed through a symbolic representation.

Figure 7:
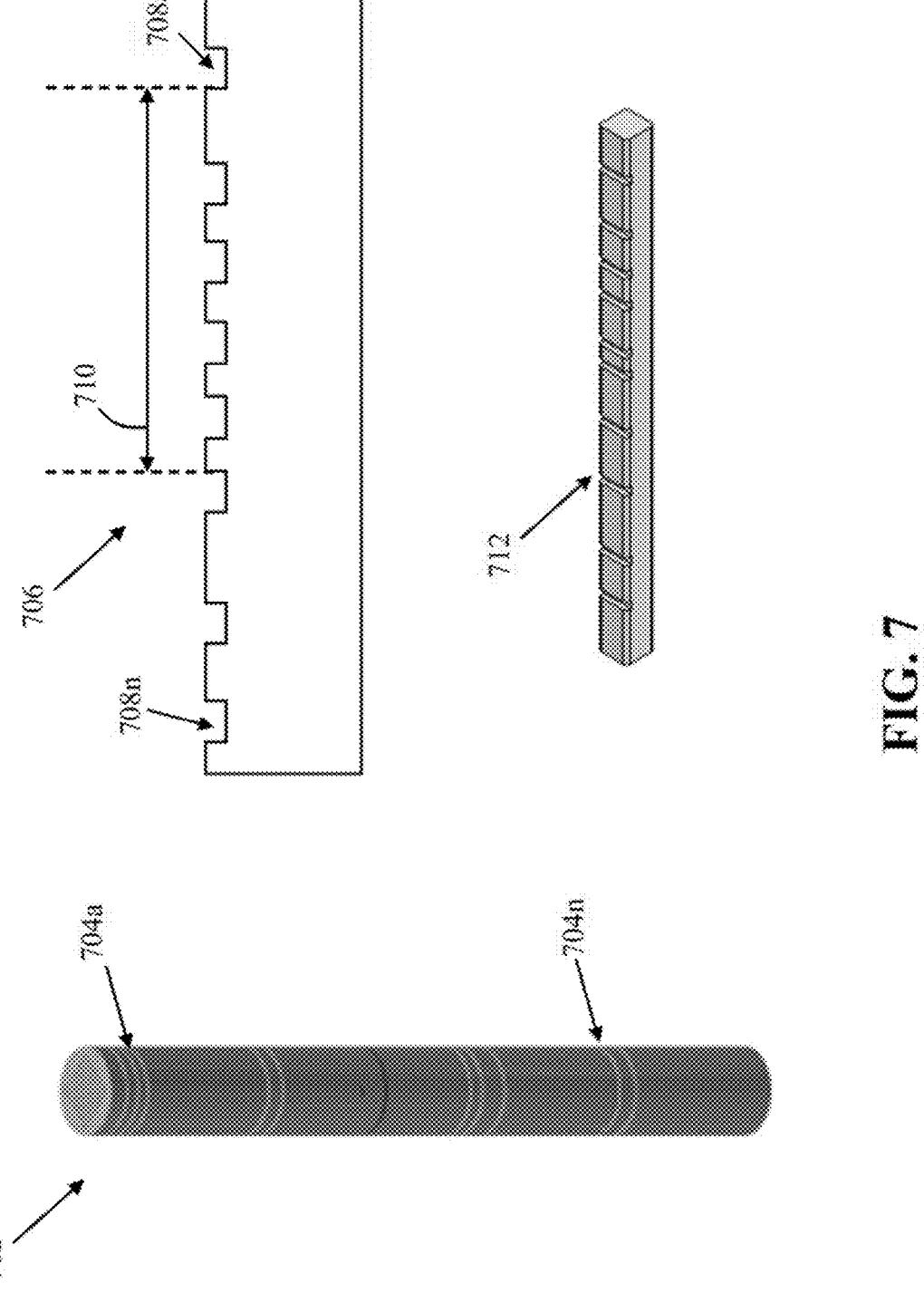
FIG. 7 depicts representative tokens with a plurality of rings or other demarcations (e.g., linear channels) in accordance with the present invention.
Figure 8:
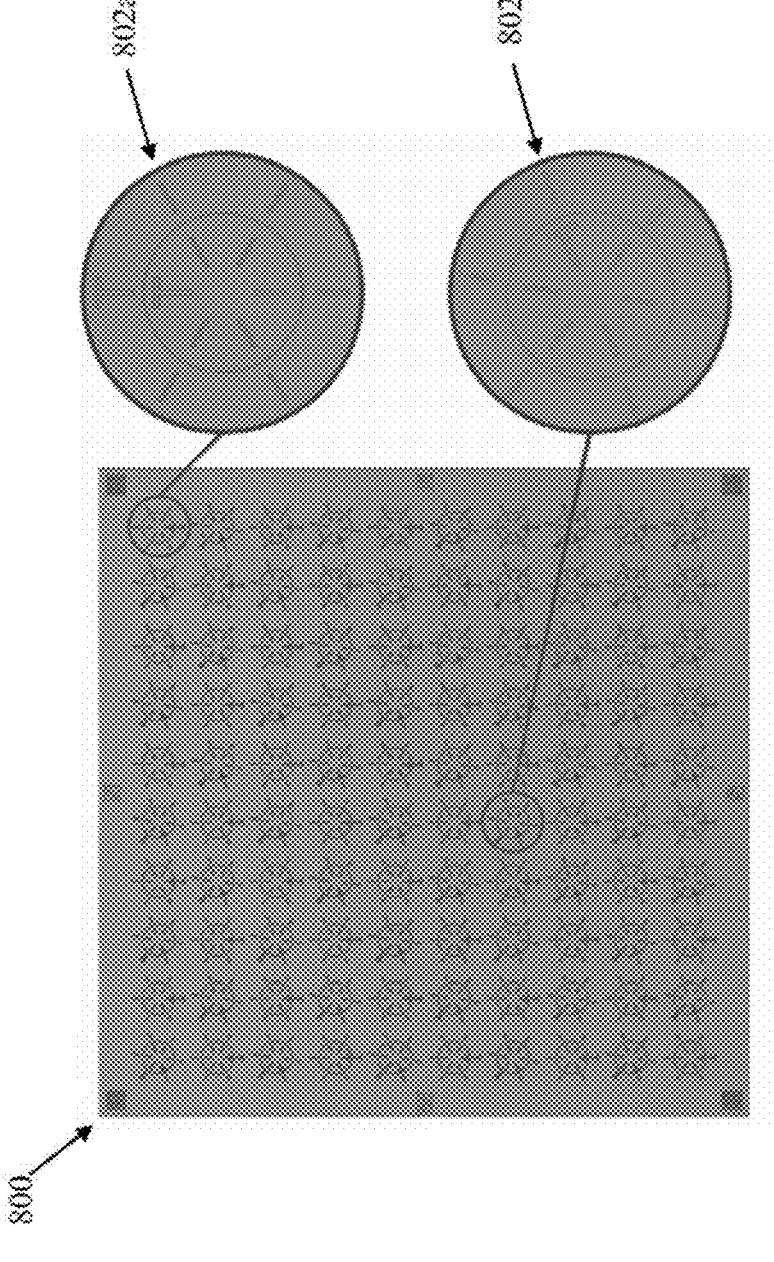
FIG. 8 depicts a representative reference plate with a plurality of apertures to accept tokens, in accordance with the present invention.

Also, in accordance with the present invention, an invention comprises two principal physical objects. The first is a token (e.g., tokens 702, 706 in FIG. 7) and the second is a reference plate 800 (FIG. 8). There is a plurality of other objects and devices that are ancillary to the function of the primary objects that are described in part below. The token can take any shape, but it is preferably made of rigid structure (e.g., steel) that is capable of having the formed recesses (e.g., recesses 704a-n and recesses 708a-n, wherein "n" represents any number greater than one) measured with a caliper. The top of the token has a quick response code. This can be used to determine where it should be placed. It can also contain information such as ownership. In the preferred embodiment it is a metallic cylinder or oblong shape. Each token may have one or a plurality of engraved rings or formed recesses 104 which may be randomly placed along the length of the token by an algorithm instructing a computerized tooling such as a computer number control machine tool. In this embodiment the top of the tokens has a quick response code engraved therein. Said another way, the process of generating an encryption key may first include providing a plurality of physical tokens (like the tokens 702, 706 depicted in FIG. 7) each having a plurality of randomly formed spaced demarcations 704a-n thereon and a physical reference plate 800 formed with a plurality of channels each shaped and sized to receive the plurality of physical tokens 702a-n and each having at least one randomly formed reference point demarcation associated therewith (seen best exemplified in FIG. 10).

FIG. 8 depicts a representative reference plate 800 having a plurality of apertures 802-*a-n* sized and shaped to receive a plurality of cylindrical tokens 702. The plate 800 has engravings or demarcation reference points (e.g., recesses and/or ridges) on the top to show reference points as well as orientation guides and quick response codes. The reference plate can be any shape and can accept any shape token. In the preferred embodiment it is a squared metallic plate with machined holes to accept a plurality of tokens. On the surfaces of the plate are a plurality of Reference Points, quick response codes, cardinal directions, and other information as desired etched onto the plate (FIG. 8).

Figure 10:
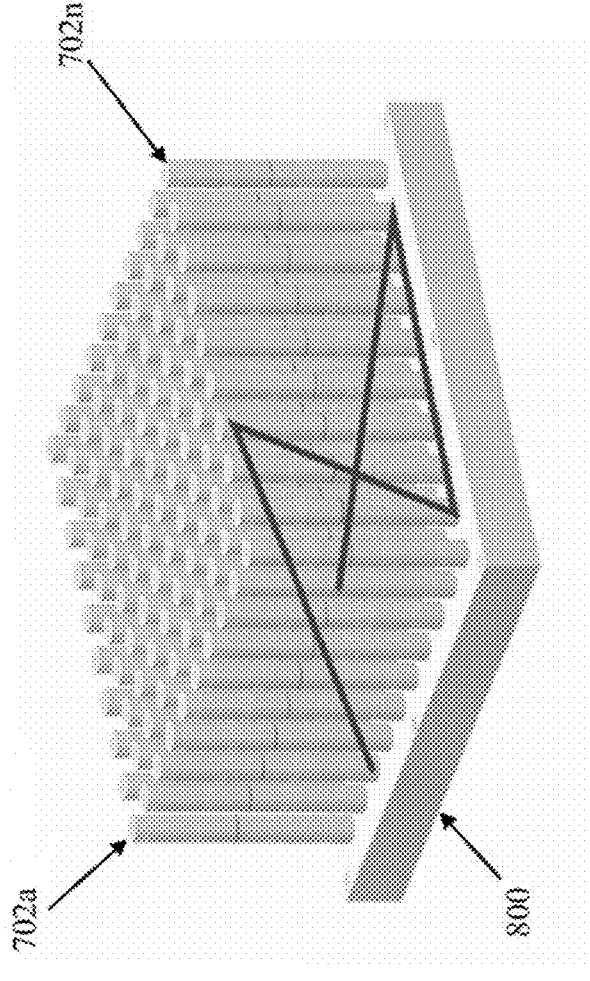
FIG. 10 is a visual representation demonstrating how the linear distances from the center of a ring on a token is measured to a first reference point and then to other reference points, in accordance with the present invention.

The next step in the process may include inserting each of the plurality of physical tokens 702*a-n*, 706 into one of the plurality of channels and placing the inserted plurality of physical tokens 702*a-n* in an erect configuration relative to the physical reference plate (exemplified best in FIG. 10). Next, the process may include measuring and summing token distances between a plurality of sets of the plurality of physical tokens to generate an encryption key, wherein each token distance defined by one of the plurality of randomly formed spaced demarcations on one of the plurality of physical tokens in a set (preferably at a demarcated center) or the at least one randomly formed reference point demarcation on the physical reference plate associated therewith and another one of the plurality of randomly formed spaced demarcations on one of the plurality of physical tokens in the set or the at least one randomly formed reference point demarcation on the physical reference plate associated therewith.

In one embodiment of the present invention, the encryption key may be utilized to effectuate secure transfer of digital communications, e.g., private mail. Specifically, multiple tokens 706 will be distributed to multiple different users, wherein there is no serial number or master log. To begin with, one of the users (i.e., "sending user") will measure the distance (e.g., distance 710) between two or more demarcations/recesses 708*a-n* (e.g., 1.560 inches). Said sending user will utilize a software application or other software to insert an alphanumeric message to another user (i.e., "receiving user"). The sending user will insert the measured distance 710 and/or, for example, a pin (that may be generated from the number of recesses used to generate the distance 710, e.g., recess 1 and 6 from FIG. 7, i.e., the pin is 16). With the measured distance 710 and pin, said message will be encrypted. The receiving user will have measure the same recesses to generate the same distance on the token he or she possess and/or generate the same pin in order to decrypt the message using the same software application or other software, i.e., a first plurality of randomly formed spaced demarcations are provided to another of the receiving user for measuring the said first plurality of randomly formed spaced demarcations to generate the at least one token distance on the at least one physical token to recreate the encryption key to decrypt and access the message or the data.

There can be a plurality of types of physical blockchain. The tokens and reference plates can take on any shape as long as within any one system of physical blockchain they are compatible with each other. This is not meant to exclude the possibility of multiple types of physical blockchain being able to interface with each other.

Figure 9:
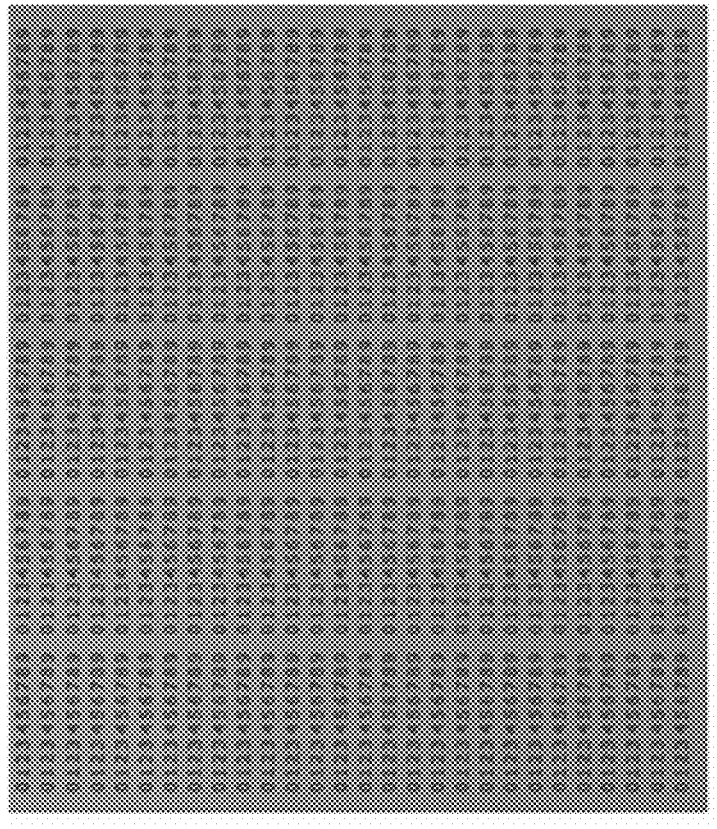
FIG. 9 depicts an ownership plate showing the progression of new Originating Points (OPs) as new information is created, in accordance with the present invention.

The location of the reference points may be mapped by a plurality of methods including a randomizing algorithm. In one embodiment the designation of the reference points is etched onto the bottom of the plate as exemplified in FIG. 9. This allows the cryptographic key to be recovered if it is lost in its digital form.

This system of engraving and quick response codes allows the map to be recreated. This can be coupled with a plurality of other forms of verification such as personal identification numbers, biometrics, third party verification, reference to natural phenomena or other methods. In this embodiment the proper token and plate match is determined by the quick response codes on the token and the plate. The location of where each token fits may be based on reference to the quick response code as well. However, a plurality of other methods may be used.

There are many ways to determine proof of stake using this system. In one embodiment an algorithm provides a map of the distances to a plurality of some of the reference points to the owner of a token or of a single ring on the token, as exemplified in FIG. 10). Using the known distances and coordinate geometry the owner can use a plurality of methods to respond to the query. That sum is the cryptographic key needed to demonstrate proof of stake.

Figures 11, 12:
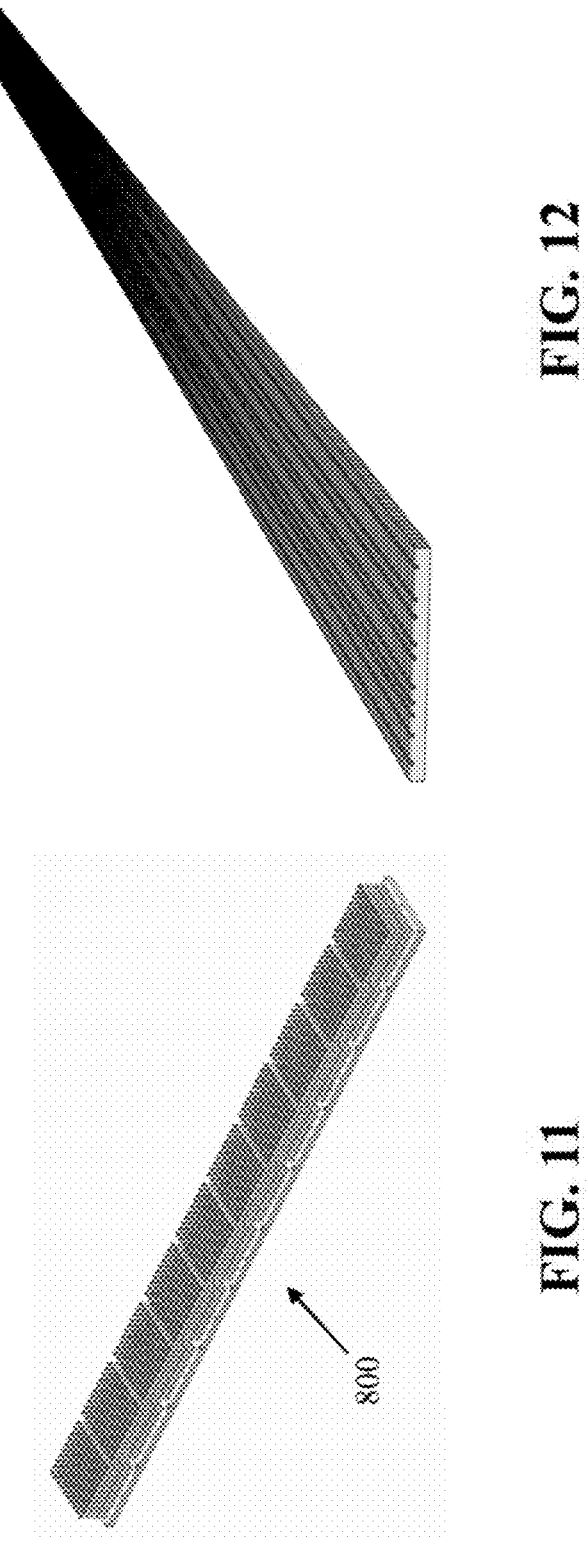
FIG. 11 shows how multiple reference plates can be placed together to increase the number of reference points and tokens, in accordance with the present invention.
FIG. 12 is an arrangement of tokens coupled together in accordance with one embodiment of the present invention.
Figure 13:
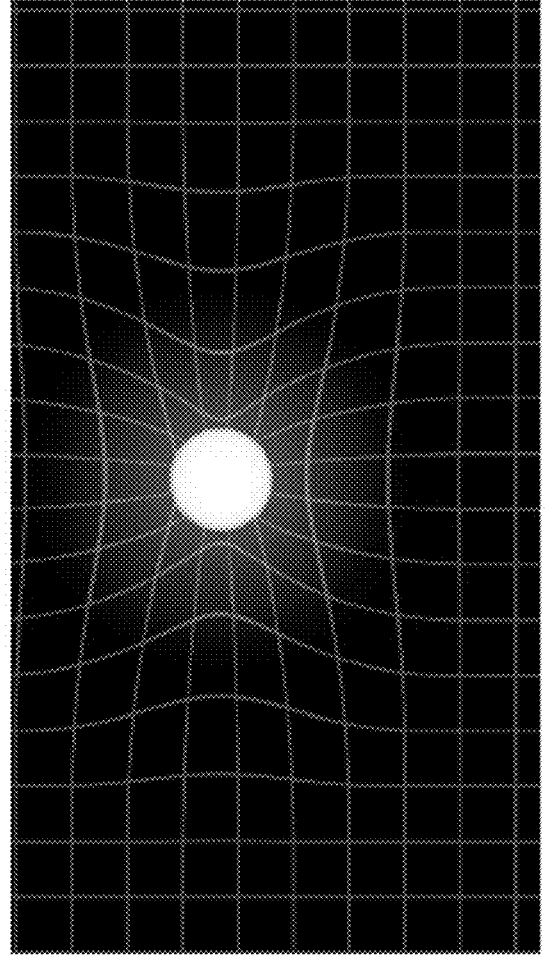
FIG. 13 demonstrates how a notional gravitational pull can alter the linear distances, in accordance with the present invention.
Figure 14:
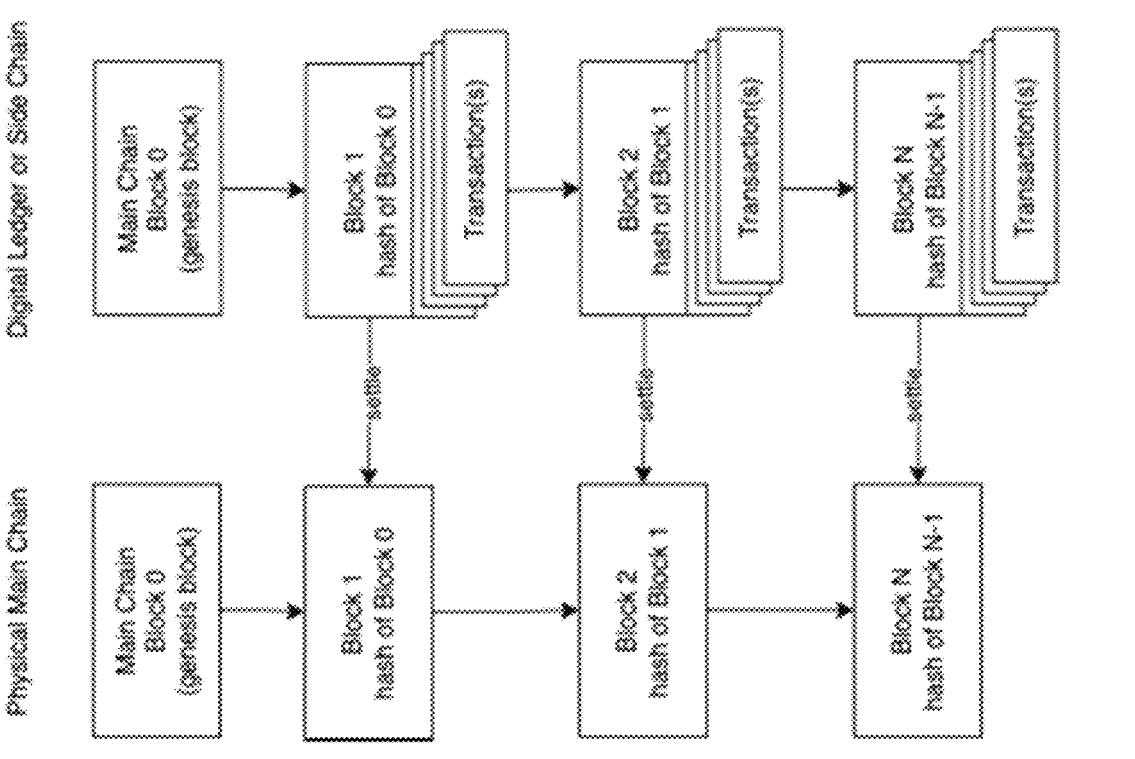
FIG. 14 depicts a flowchart diagram of microtransactions, in accordance with the present invention.
Figure 15:
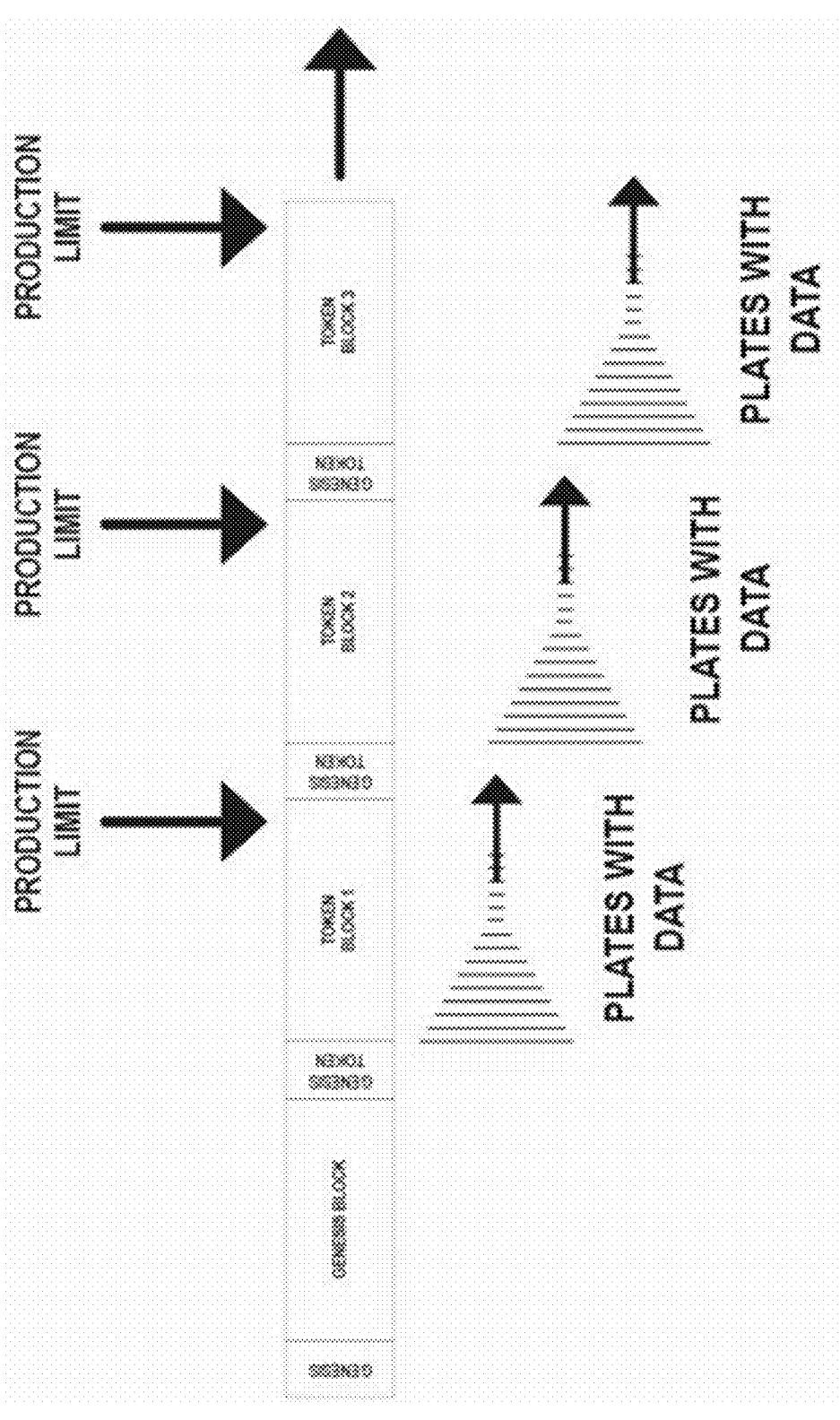
FIG. 15 depicts another implementation of the invention tailored for a large-scale blockchain application including the gates that trigger the production of new tokens.

Assuming that the reference plate has 1,000 reference points then the possible permutations of the sum of the linear distance between 5 reference points is (1,000×1,000×1,000× 1,000×1,000). That is 1 quadrillion, 1,000,000,000,000,000, possible permutations for just 5 reference points. This large number of permutations in a single reference plate allows for a massive number of maps to be created facilitating multiple token and ring owners and multiple transfers of ownership of same. In another embodiment multiple reference plates can be joined together in a pattern to allow greater number of permutations (FIG. 11). This can also be used to create a single self-contained blockchain.

Reference plates can be stored in a plurality of ways. They can be stored, for example, in one or more secure repositories, distributed to users, or a combination of both. Reference plates stored in a designated repository can be under closed circuit television or some other form of monitoring available to all. This embodiment can provide a visual verification that may be desirable in low trust countries or situations.

In another embodiment, the linear distances need not by in a straight line. An algorithm may be used to create notional gravitational forces that can bend the lines much as celestial bodies bend light. The different gravity weights of the bending can then be used to alter the length of the linear distances between the center of the ring and the reference points (FIG. 12). This can allow multiple parties to hold portions of the key. The gravity weight system can also be used to create additional plots. It may also be used to create a new plot if portions or the entire old plot is feared to have been stolen.

In another embodiment a plurality of mathematical calculations can be used to alter the sum of the linear distances to yield a key. For example, a third party may be in possession of a numerical multiplier. That multiplier must then be used to complete the key. The vast number of potential permutations in any key renders the use of computational work to determine the key uneconomical and therefore unfeasible.

Physical blockchain establishes proof of stake by using coordinate geometry. There are a plurality of ways to do this. In the preferred embodiment the method is to create randomized points on tokens and on reference plates. These points are then plotted in a multi-dimensional map. This map may be kept in digital or physical form or both. The map may be distributed in full or in part.

Another embodiment of this invention is that a physical object owner such as a token owner can verify their ownership using purely mechanical means. In one embodiment the token owner can go to a third party with the token. The third party can use a check plate and a micrometer or caliper to determine the position of the ring on the token and thus ownership. In the same way, a micrometer can be used to determine the distance between reference points on the reference plate to reconstruct the plot.

The verification of the tokens and the reference plates can be done in solely mechanical means. The tools necessary to do so are readily available worldwide and inexpensive. This feature has a plurality of uses. It can be used to reconstruct the key after a disaster destroys digital copies, it can be used by resource poor individuals or organizations, it allows for anonymous proof of stake and many other uses.

In another embodiment a kiosk can be used to verify ownership of a token. In this embodiment the token can be inserted into a kiosk which then uses electrically controlled scanners and or mechanical means to determine the location of the ring or rings on the token. In one embodiment this type of authentication can be used in a similar manner to an automatic teller machine. Other devices, such as portable ones or devices that are fixed and mimic locks or any other type can also be employed for authentication purposes.

Once the correct answer is provided the now authenticated owner or authorized person or organization has the key. This can be used to gain access to one or more digital files. The data files have no constraints in number or hosting location. This embodiment allows the token to act in a similar manner as a bearer bond. A completely anonymous person presents himself with a self-authenticating document that gives access to files, securities, or any number of other things. Further, another embodiment is to use the key to provide authentication or falsification of documents.

For example, in one embodiment a document can be printed with reference points. Coordinate geometry can then be employed to measure linear distances between reference points on the document and specific punctuation marks or some other location. Correct linear distances can be determined in a plurality of ways such as mechanical measurement using a micrometer or ruler or other device. Correct linear distances can also be determined by using a variable scale which is printed on the document allowing remote authentication. In this way the alteration or forgery of documents can be thwarted. This may be of particular interest in low trust situations such as corruption prone countries.

An important utility of physical blockchain is that it can perform all the functions found in digital public, digital hybrid, digital private and digital consortium blockchain. Wallets are created by having a publicly know Originating Point (OP) and Destination Point (DP). Wallets are purely digital linked to physical plot. They are limited to larger amounts for withdrawal or deposit due to physical nature requiring physical additions to the chain. So perhaps a minimum of $1,000.

Chain of DPs are used to add data and to show prior data from that wallet. The current DP is what needs to be known to access all prior data. This may then be stored by the owner or publicly on an ownership plate which is engraved with the last DP. An ownership plate is kept in the repository and is where the newest OPs are engraved on a steel plate for recovery.

Access to the wallets is done using a Secret Value. Secret Value Measurements taken from Key using micrometer or caliper between rings or demarcation points on a token.

What is the sum of the distance between rings 2 and 5 and 7 and 9? In thousandths of an inch. This gives access to the wallet. For example, in another embodiment and with reference to FIG. 7, the caliper will be used by the user to measure the distance between two of the plurality of randomly formed spaced demarcations 708$a$-$n$, wherein said distance will be used as a multiplier (as discussed herein) for encryption purposes, i.e., to generate the key for decryption and encryption.

Additionally, a method of utilizing physical objects in a blockchain may also include having the tokens 702, 706, which may be constructed of any material, with the demarcations 704$a$-$n$ produced in any manner which can be measured with useful accuracy, wherein the tokens 702, 706 and demarcations 704$a$-$n$, 708$a$-$n$ may be arranged in any manner such as, but not limited to, linear notches, holes on a grid, or laser markings on an optical disk. Data may be stored on singular tokens, groups of tokens of a homogenous type, or heterogeneous groups of tokens of different styles such as inserting linear steel tokens into channels in a base plate to create a 3D demarcation pattern from a combination of 1D and 2D tokens. Groups of tokens may also be arranged into an established pattern, although this pattern need not be permanently fixed and may instead be fully or partially dynamic. For example, and with reference to FIG. 7 and FIG. 12, a group assembled tokens, like tokens 706, 712, are one-dimensional tokens that are configured to be arranged to produce a two-dimensional blockchain array, although the notches on each token will be unique. The slots defined on the tokens 706, 708 do not necessarily need to be continuous and may be discontinuous in some embodiments. Further, the process may include measuring and summing distances between demarcations to generate data, with the demarcations being on either the same token or different tokens and applying any desired transformations to the measured distances such as generating a circular arc between three demarcations and then utilizing the resulting data to perform any desired task, e.g., key generation.

Transactions from a computer can be made in many ways. What follows is an example. First, use a key as a pin to download a partial plot. Then contact the wallet. Then order payment to be made. Then the wallet contacts you with a question on the sum of the distance from the OP to N RPs based on last downloaded partial plot. Then the app correctly calculates the answer and responds. Then the wallet releases funds.

Transactions from a key can be made in many ways. What follows is an example. First, it's the key to authenticate your proof of access to a wallet. Then present the token to the counter party or third party. Then use the manual mechanical or automated means to match the key to the correct location on the chain. The correct hole/block location can be printed on the token or presented from memory or written form. Then this will yield the OP. Then follow the process of transaction from a computer.

This is the process by which data is stored and retrieved. Documents are recorded in plain text. This is then converted to the new language. This yields a numerical value. This is then the unit of distance from the appropriate OP to a RP. The distance will need a remainder to bring it exactly to the RP.

Recovery of the plot can be done in a number of ways. A scanner can be used to recover the entire chain in a short amount of time. Also, the keys and owner plates can be centrally stored for recovery.

The interface between the physical state and a digital state can be created in a number of ways. What follows is an example. First, the owner uses the key to derive a Secret Value. He does so using a micrometer to take measurements taken from key. What is the sum of the distance between rings 2 and 5 and 7 and 9? 2579 is the PIN and can recover the secret value.

Then, the owner, or a controlling authority, assigns the key an Originating Point on the chain. This is in the format of Plate #/Row #/Hole/Channel #. This is the first half of the public address.

The data is converted into new language which yields a Destination Point on the chain. This is in the format of Plate #/Row #/RP #/Remainder. This is the second half of the public address. At this point the transaction or data entry is done digitally as it is done in existing blockchain with the Secret Value giving authority to make changes.

Changes are then converted back into new language to yield a new number. This is then plotted to a new DP. The new DP is then recorded. In an oligarchic chain it is engraved on the owner plate. In a non-oligarchic chain, it is stored by the owner and or the counterparties in whatever manner they choose. Do we need tokens to create speculative value? These can then be traded for fiat currency like dollars and euros.

The functionality of the present invention includes data recording and micro transactions. An example of data recording can be a land deed. In this case the text of the land deed is translated from plain language into a code that yields the exact language of the land deed. This is then encoded into the block chain and recorded on an owner's plate.

The process goes as follows. First, the original land deed is translated into the new blockchain language of numbers. Instead of using 0's and 1's as in digital a 0-9 format is used. This new long numerical chain is then plotted. This is done by taking the distance from an originating point and then measuring it out to the corresponding destination point in standard units of linear measurements. For example, assume the unit of linear measurement is $\frac{1}{64}$". Then you measure the number of units of measurement to the nearest RP on the chain. This distance is yielded in two plot points. The Originating Point and the Destination Point. This is then engraved on the appropriate Owners Plate where that information is secure. If there are any additions to the land deed, then this will yield a new Destination Point which will include the previous data in addition to the new data.

An example of transactions and microtransactions can be purchasing a coffee at a cafe with a credit card. A payee's account can be debited for a purchase, the charging party can be credited, and the results can be stored permanently to a physical blockchain for verifiable proof of transaction. The payer places their payment chip card in proximity to a point-of-sale device, which communicates with a remote server to request authorization to charge. Authorization completes or fails in 1-3 seconds. The result of this authorization is stored in a digital ledger. Every 48 hours, a program reads the digital ledger and sends a message to the physical blockchain microcontroller requesting to settle the accounts by encoding values into the physical chain. FIG. 7 depicts a flowchart diagram of microtransactions. Any number of transactions may be executed between block formations on the main chain, and settled at once in the next block, recorded permanently and in-alterably.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features

What is claimed is:

1. A method of utilizing physical objects in blockchain comprising the steps of:

providing at least one physical token to different users, each of the at least one physical token having a plurality of randomly formed spaced demarcations thereon and each of the plurality of randomly formed spaced demarcations defining a physically measurable token distance between said plurality of randomly formed spaced demarcations;

measuring at least one token distance on one of the at least one physical token by one of the different users using a first plurality of randomly formed spaced demarcations and performing a mathematical operation utilizing said at least one measured token distance to generate an encryption key, wherein the encryption key is one of a plurality of unique permutations generated using the at least one physical token;

utilizing the encryption key through software to encrypt or decrypt a message or data;

providing the first plurality of randomly formed spaced demarcations to another of the different users; and measuring the first plurality of randomly formed spaced demarcations to generate the at least one token distance on the at least one physical token by the another of the different users to recreate the encryption key through software to decrypt and access the message or the data stored on a blockchain network.

2. The method according to claim 1, further comprising:

providing a physical reference plate formed with a plurality of channels each shaped and sized to receive a plurality of physical tokens and each having at least one randomly formed reference point demarcation associated therewith; inserting each of the plurality of physical tokens into one of the plurality of channels and placing the inserted plurality of physical tokens in an erect configuration relative to the physical reference plate and measuring each token distance by utilizing:

one of the plurality of randomly formed spaced demarcations on one of the plurality of physical tokens in a set of physical tokens or the at least one randomly formed reference point demarcation on the physical reference plate associated therewith; and another one of the plurality of randomly formed spaced demarcations on one of the plurality of physical tokens in the set or the at least one randomly formed reference point demarcation on the physical reference plate associated therewith; and generating the encryption key utilizing each token distance.

3. The method according to claim 2, further comprising:

providing the physical reference plate with a plurality of rows and columns each formed with the plurality of channels configured to form a three-dimensional map utilizing the token distances.

4. The method according to claim 3, wherein each token distance is linear.

5. The method according to claim 2, further comprising:

providing at least one of a plurality of physical reference plates and the plurality of physical tokens arranged together for measuring the at least one token distance.

6. The method according to claim 2, further comprising:

providing the plurality of physical tokens with a reference code thereon and providing the physical reference plate with a reference code associated with each of the plurality of channels and corresponding to the reference code on one of the plurality of physical tokens; and inserting each of the plurality of physical tokens into one of the plurality of channels with a corresponding reference code to maintain proper placement.

7. The method according to claim 1, further comprising:

generating the encryption key by measuring a linear distance between two of the plurality of randomly formed spaced demarcations and multiplying the linear distance by a numeral multiplier.

8. The method according to claim 1, wherein the token distance is utilized in forming a three-dimensional map.

\* \* \* \* \*